Oct. 12, 1926.
W. WOOLGAR, SR
1,602,472
HUB AND AXLE ASSEMBLY
Filed Oct. 2, 1924
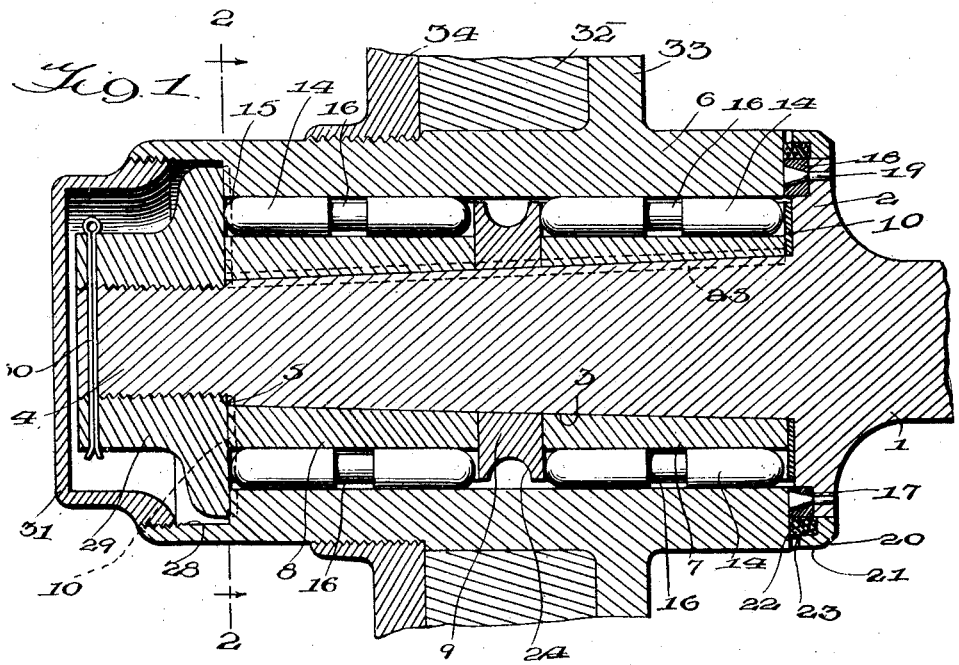
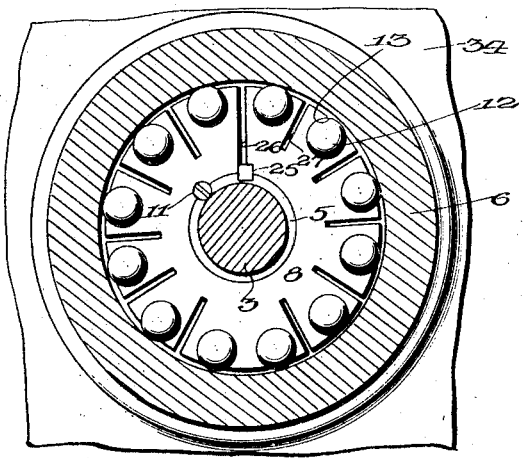
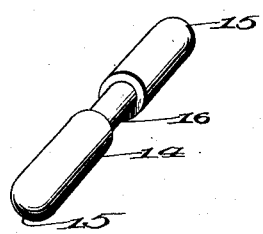
WITNESSES
INVENTOR
Wm. Woolgar, Sr.
BY
ATTORNEYS Patented Oct. 12, 1926.

1,602,472

UNITED STATES PATENT OFFICE.

WILLIAM WOOLGAR, SR., OF ZILWAUKEE, MICHIGAN.

HUB AND AXLE ASSEMBLY.

Application filed October 2, 1924. Serial No. 741,223.

My invention is an improved hub and axle assembly, and it consists in the combinations, constructions and arrangements herein described and claimed.

An object of the invention is to provide a hub and axle assembly in which the hub is mounted to rotate on the axle with but relatively little friction and in which provision is made for automatic adjustment of relatively moving parts of the assembly to compensate for wear on such relatively moving parts.

A further object of the invention is to provide an assembly of the character described which is constructed in such manner as to permit lubricant to be supplied to relatively moving surfaces of the device while dust is excluded from such relatively moving surfaces.

A still further object of the invention is to provide an assembly of the character described which comprises but relatively few parts, and is strong and durable, not likely to get out of order easily and thoroughly practical commercially.

Other objects and advantages will be apparent from the following description, considered in conjunction with the accompanying drawings, in which—

Figure 1 is a longitudinal vertical section through a hub and axle assembly embodying the invention, Figure 2 is a section along the line 2—2 of Figure 1 and Figure 3 is a perspective view of one of the roller bearings which are comprised in the device.

In carrying out the invention, I make use of an axle 1. The axle 1 is provided with a flange 2 at an appreciable distance from the adjacent end thereof. The end portion of the axle tapers regularly from the flange 2 nearly to its extremity, as indicated at 3 and the tapering end portion 3 of the axle is merged into a still further reduced attaching end 4 which is provided with external screw threads and is shown as being uniform in diameter throughout its length. An annular shoulder 5 thus is produced between the attaching end 4 and the tapering portion 3 of the axle.

A cylindrical hub 6 has an inner diameter considerably greater than the outer diameter of the tapering portion 3 of the axle at the larger end of the latter. However, the diameter of the bore of the hub 6 is less than the diameter of the flange 2.

The hub 6 is supported anti-frictionally on the tapering portion 3 of the axle to rotate about the axis of the latter by means which will now be described. Such means comprises a roller bearing supporting sleeve mounted on the tapering portion 3 of the axle and illustrated in the drawings as consisting of axially aligned end sections 7 and 8 respectively and a spacing ring section 9 which is disposed on the tapering portion 3 of the axle between the adjacent ends of the sections 7 and 8. The bores of the members 7, 9 and 8 decrease regularly in diameter or taper to complement the taper of the portion 3 of the axle so that the members 7, 9 and 8 will closely fit the tapering portion 3 of the axle when they have been placed in the order named over the end of the axle onto the tapering portion 3. It is to be observed at this time that a steel washer 10 having an inner diameter but slightly greater than the diameter of the attaching portion 4 is placed on the axle 3 before the members 7, 9 and 8 have been placed on the tapering portion 3 of the axle. The combined length of the members 10, 7, 9 and 8 is approximately the same as the length of the tapering portion 3 so that the member 8 will be substantially flush at its outer end with the shoulder 5 when the members 7, 9 and 8 have been placed on the tapering portions 3 of the axle in the order named and in the positions shown in Figure 1.

With the arrangement just described, the washer 10 is held against the outer end of the flange 2, the spacing ring 9 in abutting relation to the outer end of the section 7 and the section 7 abuts the washer 10. The members 7, 9 and 8 are held against axial movement outward on the axle 3 by a screw 11 which threadedly engages a socket 12 that is formed partly in the shoulder 5 and partly in the section 8 as clearly shown in Figure 2 and by other means which will presently be described.

Each of the sections 7 and 8 is formed with a plurality of circumferentially spaced grooves 12 in its outer periphery. The grooves 12 extend longitudinally of the sections 7 or 8 in which they are formed and are nearly circular in cross section. Each groove 12 opens at its opposite ends through the ends of the section in which it is formed and also is open for its entire length at the outer periphery of the section, as indicated at 13, the opening 13 extending for the full length of the groove and having a width less than the diameter of the groove. Each groove 12 provides a seat in which a roller bearing 14 is rather loosely and rotatably supported. Each roller bearing 14 has an elongated body provided with rounded ends as indicated at 15 and is circular in cross sectional contour at any point along its length between the rounded ends thereof, the intermediate portion of the body of the roller bearing being reduced to provide a circumferentially extending relatively wide groove 16 in the periphery thereof for a purpose to be presently described.

The ring 9 extends radially outward beyond the inner walls of the grooves 12. The roller bearings 14 protrude through the openings 13 beyond the outer wall of the ring 9 and also beyond the outer wall of the sections 7 and 8. A circle tangent to the protruding portions of the roller bearings 14 in the groove of either of the sections 7 or 8 will have the same diameter at any point along either of the sections 7 and 8. Therefore, these protruding portions of the roller bearings are adapted to anti-frictionally support the hub 6 in spaced concentric relation to the tapering portion 3 of the axle when the hub 6 has been slipped over the outer end of the section 8 to the position shown in Fig. 1.

The flange 2 has a diameter less than the outer diameter of the hub 6 and is rabbeted at its inner end as indicated at 17 for the reception of a steel cushioning or bumper ring 18 which is held in the rabbet by rivets or like fastening devices 19 which have the inner ends thereof countersunk in the ring 18 as shown.

The hub 6 is provided at its inner end with an annular extension 20 which fits over the flange 2 and is provided with an annular groove 21 in its inner periphery for the reception of a ring 22 of absorbent material. Radial openings 23 extend through the extension 20 into the groove 21. Lubricant may be forced through the openings 23 onto the ring 22 and will feed from the latter slowly between the cushioning ring 18 and the hub 6 into the space between the members 7, 9 and 8 and the hub 6. It of course will be understood that the members 7, 9 and 8 and the roller bearings protruding therefrom may be covered with a suitable lubricant before the hub 6 is placed in position thereon, the lubricant filling the grooves 16 of the roller bearings and also filling a circumferential groove 24 which is formed in the spacing ring 9.

The members 7, 9 and 8 are held against rotation on the axle by a locking key 25 which is received in a keyway that is formed partly in the sections 7, 9 and 8 and partly in the tapering portion 3 of the axle as indicated by the dotted lines in Figure 1 and as shown in Figure 2. A radial slit 26 extends in each of the sections 7 and 8 from this keyway to the outer wall of the sections and between two adjacent grooves 12 of that section. Other radial slits 27 extend from the outer wall of each of the sections 7 and 8 for part of the thickness of the section but terminate short of the inner wall of the section. The slits 26 and 27 correspond in number with the grooves 12, there being a slit between each two adjacent grooves 12. Each of these slits extends the full length of the section in which it is formed. Each of the sections 7 and 8 is formed of a material possessing inherent resiliency, such as spring steel. The arrangement is such that the sections 7 and 8 will be constricted radially when the hub 6 is placed in position on the roller bearings carried thereby so that the inherent resiliency of the material of the sections 7 and 8 will act to hold the roller bearings close against the inner wall of the hub 6 and to cause the sections 7 and 8 to expand radially to compensate for any wear on the inner wall of the hub 6.

The hub 6 is counterbored at its outer end as indicated at 28 to receive a jamb nut 29 which is screwed on the attaching portion 4 of the axle against the shoulder 5 and the outer end of the section 8 of the expansion sleeve. The nut 29 will be held against retrograde movement from the outer end portion of the axle by a cotter pin 30 or like fastening means.

A hub cap 31 has external screw threads on a radially enlarged inner end portion thereof for engaging with external screw threads on the outer end portion of the hub 6, whereby dust will be excluded from the space between the hub 6 and the parts received therewithin. The hub cap 31 is out of contact with the axle and with the nut 29.

From the foregoing description of the various parts of the device, the operation thereof may be readily understood. The hub 6 may have spokes or a web 32 secured thereon in any suitable known manner as by means of the fixed flange 33 and the removable flange 34. The hub can turn about the axis of the fixed axle with but very little friction since the relatively moving parts of the assembly can be kept well lubricated and play is prevented between the relatively moving parts of the assembly because of the structural features which have been described in detail in the foregoing. Any wear on the inner wall of the hub will permit outward expansion of the sections 7 and 8 and therefore the roller bearings 14 will be held in close contact with the inner wall of the hub at all times. It will be observed by referring to Figure 1 that the spacing washer 10 can be moved from the position indicated by the full lines to the position at the outer end of the section 8 indicated by the dotted lines to prevent play in the assembly after wear has taken place between relatively moving contiguous surfaces of the assembly.

Obviously, my invention is susceptible of embodiment in forms other than that illustrated in the accompanying drawing and I therefore consider as my own all such modifications and adaptations of the form of the device as fairly fall within the scope of the appended claims.

I claim:—

1. An assembly of the character described comprising a fixed axle, an inner sleeve secured thereon, said sleeve comprising a longitudinally slitted section made of resilient material in a single piece and of sufficient circumference to encircle said axle, said slits extending the entire length of said section, one of said slits extending radially from the outer wall of the section through the inner wall of said section and the remaining slits extending radially only part of the distance from the outer wall of the section to the inner wall of said section, a hub loosely encircling said sleeve, and anti-friction devices disposed between said hub and said sleeve and tending to constrict said expansible section of the sleeve.

2. An assembly of the character described, a fixed axle, a longitudinal split tubular member secured on said axle, said tubular member being made of a material possessing inherent resiliency and being inherently actuated to expand radially outwardly from position close against said axle, said tubular member having a circumferentially spaced series of grooves in its outer periphery extending longitudinally thereof, the grooves being arcuate in cross section, a hub loosely encircling said tubular member, and roller bearings disposed in said grooves and protruding therefrom against the inner wall of the hub, said tubular body normally being constricted because of the engagement of said roller bearings with said hub, said expansible tubular body having other radial slits extending from the outer peripheral wall thereof partly through the inner wall of the tubular body, each of said slits being located between two adjacent grooves in the periphery of the tubular body.

3. An assembly of the character described comprising an axle having a tapering portion adjacent to an end thereof and having a flange at the inner end of said tapering portion, a sleeve fitting on said tapering portion, said sleeve comprising a pair of radially expansible end sections and an intermediate spacing ring section, the inner wall of said sleeve tapering to complement the taper of the axle, said end sections being split longitudinally and having circumferential series of grooves in the outer periphery thereof, said grooves extending the entire length of the sections and each being arcuate in cross section, said grooves extending inwardly beyond the outer wall of the intermediate section of the casing, said sleeve having a longitudinally extending slot in its inner wall in confronting relation to a longitudinally extending slot in the tapering portion of the axle, a key partially received in each of said longitudinally extending slots and locking the sleeve against rotation on the axle, said end sections of the sleeve being made of material possessing inherent resiliency and being continuously actuated to tend to expand beyond position to closely encircle said axle, a hub loosely encircling said sleeve, and roller bearings disposed in said longitudinally extending grooves in the outer walls of the end sections and engaging with the inner wall of the hub to support the hub in concentric relation to the axle and to constrict said end sections of the sleeve.

4. An assembly of the character described comprising an axle having a tapering portion adjacent to an end thereof and having a flange at the inner end of said tapering portion, a sleeve fitting on said tapering portion, said sleeve comprising a pair of radially expansible end sections and an intermediate spacing ring section, the inner wall of said sleeve tapering to complement the taper of the axle, said end sections being split longitudinally and having circumferential series of grooves in the outer periphery thereof, said grooves extending the entire length of the sections and each being arcuate in cross section, said grooves extending inwardly beyond the outer wall of the intermediate section of the casing, said sleeve having a longitudinally extending slot in its inner wall in confronting relation to a longitudinally extending slot in the tapering portion of the axle, a key partially received in each of said longitudinally extending slots and locking the sleeve against rotation on the axle, said end sections of the sleeve being made of material possessing inherent resiliency and being continuously actuated to tend to expand beyond position to closely encircle said axle, a hub loosely encircling said sleeve, and roller bearings disposed in said longitudinally extending grooves in the outer walls of the end sections and engaging with the inner wall of the hub to support the hub in concentric relation to the axle and to constrict said end sections of the sleeve, said spacing section of the sleeve extending radially outward beyond the grooves in the outer periphery of each end section of the sleeve.

5. An assembly of the character described comprising an axle having a tapering portion adjacent to an end thereof and having a flange at the inner end of said tapering portion, a sleeve fitting on said tapering portion, said sleeve comprising a pair of radially expansible end sections and an intermediate spacing ring section, the inner wall of said sleeve tapering to complement the taper of the axle, said end sections being split longitudinally and having circumferential series of grooves in the outer periphery thereof, said grooves extending the entire length of the sections and each being arcuate in cross section, said grooves extending inwardly beyond the outer wall of the intermediate section of the casing, said sleeve having a longitudinally extending slot in its inner wall in confronting relation to a longitudinally extending slot in the tapering portion of the axle, a key partially received in the axle, a key partially received in each of said longitudinally extending slots and locking the sleeve against rotation on the axle, said end sections of the sleeve being made of material possessing inherent resiliency and being continuously actuated to tend to expand beyond position to closely encircle said axle, a hub loosely encircling said sleeve, and roller bearings disposed in said longitudinally extending grooves in the outer walls of the end sections and engaging with the inner wall of the hub to support the hub in concentric relation to the axle and to constrict said end sections of the sleeve, said spacing section of the sleeve extending radially outward beyond the grooves in the outer periphery of each end section of the sleeve, end means engaging said axle and cooperating with the flange thereon to hold the sections of said sleeve against axial movement of the axle.

6. An assembly of the character described comprising an axle having a tapering portion adjacent to an end thereof and having a flange at the inner end of said tapering portion, a sleeve fitting on said tapering portion, said sleeve comprising a pair of radially expansible end sections and an intermediate spacing ring section, the inner wall of said sleeve tapering to complement the taper of the axle, said end sections being split longitudinally and having circumferential series of grooves in the outer periphery thereof, said grooves extending the entire length of the sections and each being arcuate in cross section, said grooves extending inwardly beyond the outer wall of the intermediate section of the casing, said sleeve having a longitudinally extending slot in its inner wall in confronting relation to a longitudinally extending slot in the tapering portion of the axle, a key partially received in each of said longitudinally extending slots and locking the sleeve against rotation on the axle, said end sections of the sleeve being made of material possessing inherent resiliency and being continuously actuated to tend to expand beyond position to closely encircle said axle, a hub loosely encircling said sleeve, and roller bearings disposed in said longitudinally extending grooves in the outer walls of the end sections and engaging with the inner wall of the hub to support the hub in concentric relation to the axle and to constrict said end sections of the sleeve, said spacing section of the sleeve extending radially outward beyond the grooves in the outer periphery of each end section of the sleeve, said spacing section of the sleeve being provided with a circumferentially extending groove, said roller bearings being provided with a circumferentially extending groove and said hub having a duct through which lubricant may be supplied to the space between said hub and the parts which are disposed within the hub.

WILLIAM WOOLGAR, Sr.